Aug. 22, 1939.  H. M. SIMS  2,170,598
FERTILIZER DISTRIBUTOR
Filed June 21, 1938
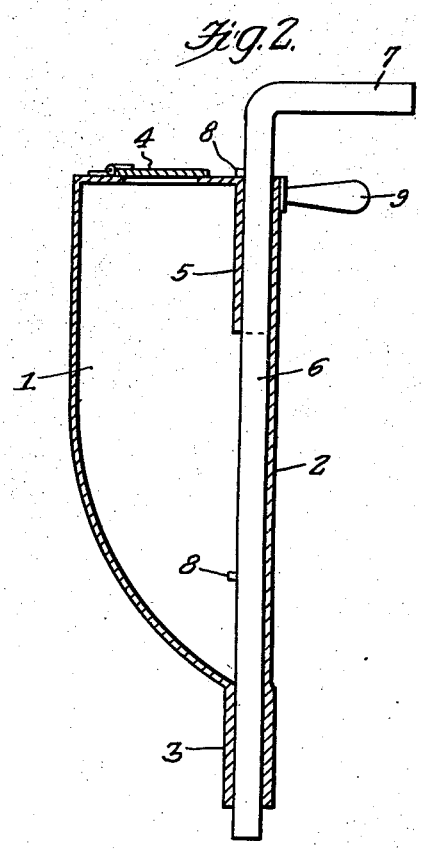
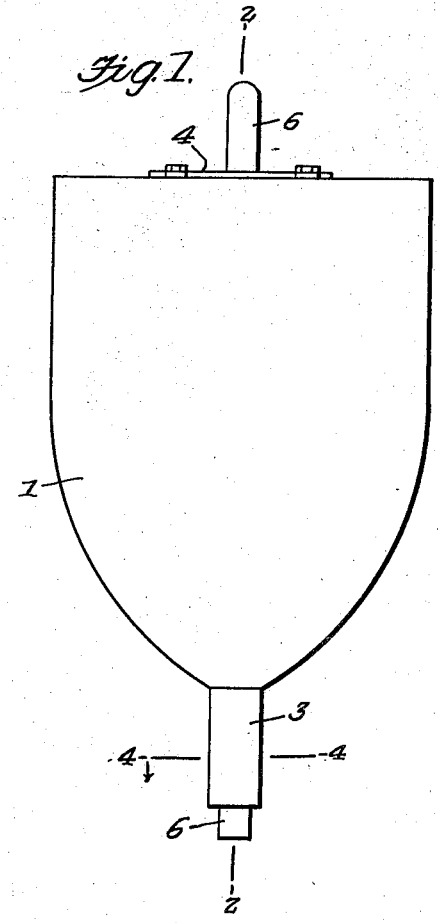
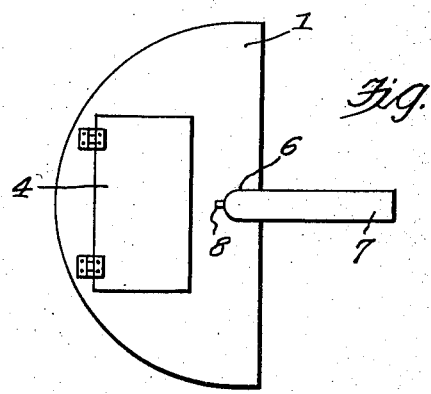
Inventor
Henry M. Sims,
By Clarence A. O'Brien
and Hyman Berman
Attorneys Patented Aug. 22, 1939

2,170,598

UNITED STATES PATENT OFFICE 2,170,598

FERTILIZER DISTRIBUTOR

Henry M. Sims, Tampa, Fla.

Application June 21, 1938, Serial No. 215,042

1 Claim. (Cl. 111—96)

This invention relates to a distributor for fertilizer, the general object of the invention being to provide a container for the fertilizer having a depending spout adapted to be pressed into the ground and a plunger passing through the container and the spout which acts to prevent dirt from entering said spout when the device is being pressed into the ground and then by raising the plunger fertilizer will enter the nozzle or spout and be forced therefrom by lowering the plunger.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a front view of the device.

Figure 2 is a section on the line 2—2 of Figure 1.

Figure 3 is a top plan view.

Figure 4 is a section on the line 4—4 of Figure 1.

In this drawing the numeral 1 indicates the container which is provided with a straight vertically arranged wall 2 and the bottom of the container slopes downwardly to a depending spout 3, the rear wall of which is formed by an extension of the rear wall 2. Thus fertilizer placed in the container will gravitate toward the spout. An opening is formed in the top of the container so that fertilizer can be placed therein and this opening is closed by a door 4. A tubular part 5 is arranged in the top of the container in alignment with the spout and a plunger forming rod 6 passes through the member 5 and into the spout when the plunger is in lowered position. The upper end of the rod is bent to form a handle 7 and stops 8 are formed on the rod to limit the sliding movement. A handle 9 extends from the top of the rear wall 2.

The device is used in the following manner. The rod or plunger 6 is held in lowered position and the spout pressed into the ground where the fertilizer is to be deposited. As will be seen when the plunger or rod 6 is in lowered position it will project from the spout, the upper stop 8 engaging the top of the container permitting this. As the spout is being pressed into the ground the handle 7 is held with enough pressure to prevent the resistance offered by the ground from raising the plunger or rod. Then the rod or plunger is raised until the lower stop 8 strikes the lower end of the member 5 and during this action the engagement of the plunger with the fertilizer will agitate the same so as to prevent clogging. Thus some of the fertilizer will enter the spout and some of it will enter the hole below the spout made by the projecting end of the plunger. Then the plunger is again lowered to force the fertilizer from the spout into the ground.

Of course, this device can be used wherever desired and it is mainly designed for garden, flower beds and potted plants and it eliminates handling of the fertilizer, after the same has been placed in the container and also eliminates the working of the fertilizer into the soil.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A device of the class described comprising a container having a straight vertical wall, a spout depending from the bottom of the container and a portion of which is formed by an extension of said wall, the bottom of the container sloping downwardly to the spout to cause the material in the container to gravitate to the spout, a tubular part in the upper portion of the container, and a part of which is formed by the upper part of the vertical wall, said tubular part being in alignment with the spout, a handle connected with the upper end of the vertical wall, a plunger rod having a handle at its upper end, said rod passing through the tubular part and through the spout, upper and lower projections on the rod for limiting sliding movement of the same, the lower projection engaging the bottom of the tubular part when the rod is raised upwardly and the upper projection engaging the top of the container when the rod is pressed downwardly, the lower end of the rod when in lowered position projecting a considerable distance from the spout to form a hole in the ground below the spout when the spout is pressed into the ground with the rod in lowered position.

HENRY M. SIMS.